Nov. 10, 1925.  1,560,935
I. FLORMAN
ATTACHMENT FOR TEMPERATURE INDICATING DEVICES
Filed Jan. 30, 1925
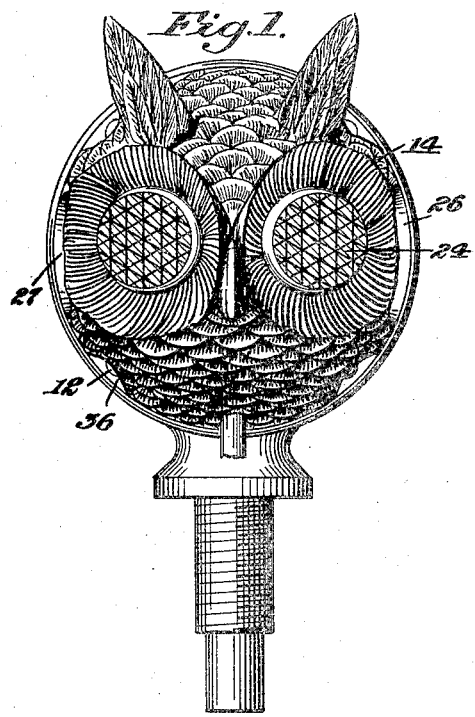
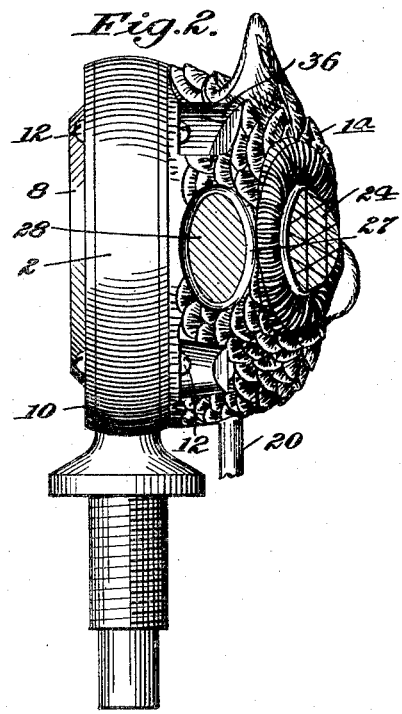
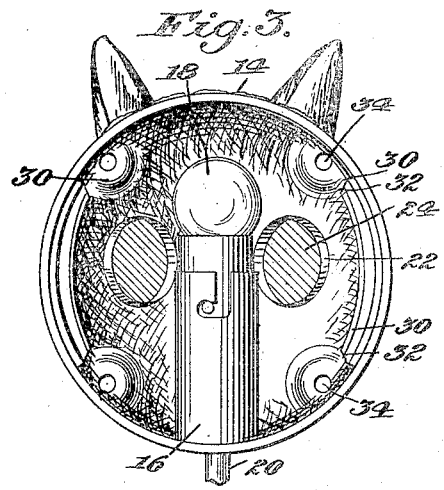
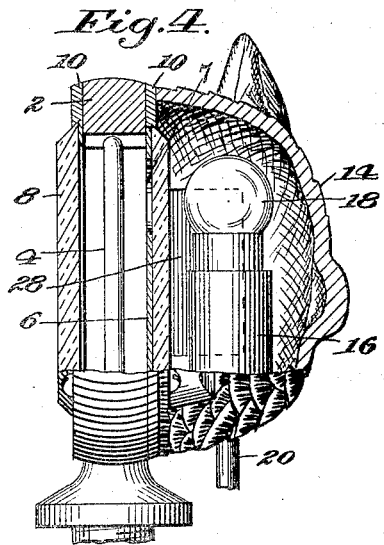
Inventor:
Irving Florman,
Attys.

Patented Nov. 10, 1925.

1,560,935

UNITED STATES PATENT OFFICE.

IRVING FLORMAN, OF NEW YORK, N. Y.

ATTACHMENT FOR TEMPERATURE-INDICATING DEVICES.

Application filed January 30, 1925. Serial No. 5,822.

*To all whom it may concern:*

Be it known that I, IRVING FLORMAN, a citizen of the United States, residing at New York, in the county of New York and State of New York, have invented a new and useful Attachment for Temperature-Indicating Devices, of which the following is a specification.

This invention relates to temperature indicating devices and particularly to indicating devices of the type commonly used upon the radiator of an automobile to advise the driver of the temperature of the water in the cooling system.

The chief disadvantage of the temperature indicating devices of this type heretofore in use resides in the fact that it is generally impossible to make a reading thereof in the dark, especially from the driver's seat. It has previously been proposed to provide the indicating dial of the device with an opening or shutter designed to admit rays of light to the back of the thermometer, as viewed from the front seat of the car, in order to facilitate the reading of the thermometer, but such a provision necessarily does not prove satisfactory at night due to the absence of sufficient light.

A general object of the present invention is to provide a device which may be readily attached to any standard temperature indicator, whereby the latter is illuminated in an efficient and satisfactory manner at all times.

A further object of the invention is to provide a signal device for motor vehicles adapted to display a danger or safety warning to other vehicles to indicate the vehicle having the right of way, thereby serving to reduce the number of accidents occurring at intersecting thoroughfares.

These and other features of the invention will appear more fully from the following detailed description when read in connection with the accompanaying drawings and will be pointed out in the appended claims.

In the drawings:

Figure 1 is a front view of an embodiment of the invention in position upon a temperature indicating device;

Figure 2 is a side view thereof;

Figure 3 is a rear view; and

Figure 4 is a vertical cross section.

Referring more particularly to the drawings, 2 indicates the main body or casing of a temperature indicating device of the type commonly employed upon the radiator of a motor vehicle. Within the casing a thermometer 4 is arranged, the thermometer being in communication with the inside of the radiator in such a manner as to record the temperature of the cooling medium therein. On the opposite side of the thermometer from the driver's seat, an indicating dial 6 is provided having indicia upon the inner face thereof to facilitate the reading of the thermometer. The dial 6 is provided with the usual opening 7 for the purpose of allowing the entrance of light to illuminate the dial and thermometer. The casing 2 is closed by front and rear plates or crystals 8 formed of glass or other transparent materials. The crystals are held in place by annular locking rings 10 having suitable openings therein for the reception of screws 12 by means of which the rings are secured to the indicator casing.

The above mentioned general features of the construction and operation of the temperature indicator differ in no essential respect from the construction and operation of indicators of this type heretofore in use, and, since it does not constitute an essential part of the present invention, will not be further described in detail.

The numeral 14 indicates a casing adapted to be detachably connected to the front face of the indicator in the manner clearly illustrated in the drawings. The casing 14 may be of any desired shape or configuration, but, since it occupies a conspicuous place upon the vehicle, it is preferable to give the casing an ornamental appearance, such as by forming it as an animal, person, or bird, the present embodiment illustrating the casing formed as an owl's head.

The casing 14 is enclosed on all sides except the rear face, which is placed adjacent the front face of the indicator. Securely mounted within the casing is an electric socket 16 adapted to receive an electric bulb 18. Current is supplied to the bulb by means of a suitable flexible wire 20, one end of which extends through an opening in the bottom of the casing, the other end being connected to the ignition system of the vehicle. The bulb 18 is substantially on the level with the opening 7 in the indicator dial 6, so that rays of light from the bulb will pass through the opening and effectively illuminate the thermometer in a manner clearly understood.

The front face of the casing 14 is provided with a plurality of spaced openings 22 within which are mounted jewels 24, the latter being held in position in any suitable manner. From this construction, it will be apparent that light from the bulb will be projected through the jewels or lenses 24 forward of the vehicle. If the casing is cast in the shape of the head of a figure, the jewels 22 are preferably arranged in a position corresponding to the eyes of the figure.

On each side thereof, the casing 14 is provided with openings 26 and 27, through which rays of light from the electric bulb 18 are adapted to project on both sides of the vehicle. The openings 26, 27 are covered by panes or windows 28 of transparent material such as glass or celluloid. Upon the inner surface of the casing adjacent the edges of the openings 26, 27 are formed upstanding ribs or projections 30, the side of the ribs toward the openings being undercut to provide guide ways 32 for retaining the windows 28 in position. From this construction, the windows 28 are removably retained in position without the necessity of additional manually operable fastening means.

While the windows or panes 28 may be of any desired color, it is preferable to have a red window covering the opening 26 which is to the driver's left, and the opposite window green. By this arrangement, vehicles approaching an intersection from the driver's left will see the red or danger signal, which will remind drivers of the approaching vehicles that the vehicle upon the right has the right of way. Similarly, a vehicle approaching from the right would see the green or safety signal indicating that approaching vehicles have the right of way.

The casing 14 is provided with openings 34 by means of which the casing is detachably secured to the indicating device through the screws 12. Adjacent each opening 34, the casing is recessed as at 36 to afford access to the screws 12.

The assembly of the casing upon the temperature indicator is extremely simple, and can be performed very quickly without the aid of any special equipment or tools. As previously stated, all standard indicators are provided with screws 12 for retaining the rings 10 in position. When it is desired to install the present invention, the screws 12 are removed, the casing is placed against the front face of the indicator so that the openings 34 register with the screw openings in the ring 10, and the screws are inserted in the openings 34 in the casing to fasten the latter in position.

Having described my invention, what I claim as new and desire to secure by Letters Patent of the United States is:

1. In combination with a temperature indicating device for an automobile radiator, a casing adapted to fit against the front face of said indicating device, the said casing being provided with an opening in each side thereof, ribs within said casing adjacent the sides of said opening, the said ribs being undercut to provide a guideway, transparent windows for covering said openings and adapted to fit within said guideways, means within the casing for projecting rays of light through said windows and for illuminating the said indicating device, and means for securing said casing to said device.

2. In combination with a temperature indicating device for automobiles, a casing adapted to fit against the front face of said indicating device, the said casing being provided with an opening in each side thereof, transparent windows for covering said openings, under cut ribs adjacent said opening on the inside of the casing for removably retaining the windows in position the said casing being also provided with spaced openings in the front face thereof, lenses mounted within said latter openings, means within the casing for projecting rays of light through said windows and lenses for illuminating said indicating device, and means for detachably securing the casing to said device.

In testimony whereof I affix my signature.

IRVING FLORMAN.